Sept. 7, 1965   A. U. BRYANT   3,204,929
GATE VALVE BODY OF WELDED CONSTRUCTION
Filed Sept. 27, 1962   2 Sheets-Sheet 1

INVENTOR.
AUSTIN U. BRYANT
BY Edward B. Gray

Sept. 7, 1965   A. U. BRYANT   3,204,929
GATE VALVE BODY OF WELDED CONSTRUCTION
Filed Sept. 27, 1962   2 Sheets-Sheet 2
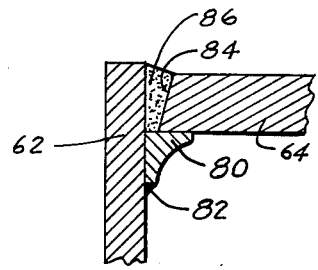
FIG-6-
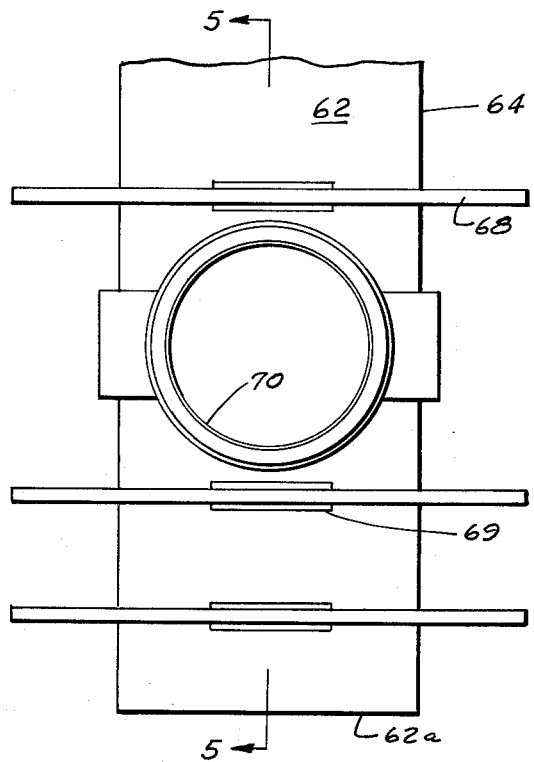
FIG-4-
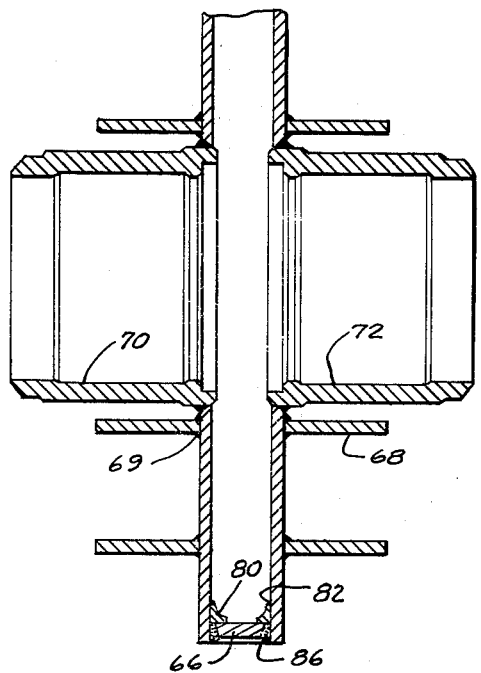
FIG-5-
INVENTOR.
AUSTIN U. BRYANT
BY Edward B Gregg

United States Patent Office 3,204,929
Patented Sept. 7, 1965

3,204,929
GATE VALVE BODY OF WELDED
CONSTRUCTION
Austin U. Bryant, Walnut Creek, Calif., assignor to Grove
Valve and Regulator Company, Oakland, Calif., a
corporation of California
Filed Sept. 27, 1962, Ser. No. 226,498
8 Claims. (Cl. 251—329)

This invention relates to the method of fabricating a valve body and the product of same and, more particularly, it relates to the body structure of a gate valve, which body structure is of the type fabricated by welding metal panels together.

In recent construction of commercial valves of the gate type, valve bodies have been fabricated from steel plate, angles, channels and the like and may consist of parallel flat end panels which are joined at opposite edges by relatively narrow side walls. The end and side wall panels are generally formed to fit together rather closely and, as a result, when the panels are fabricated by welding the adjacent panels together, the close tolerances often prevent full distribution of the weld metal. Consequently, the weld may be thinner than the wall it joins and may be interrupted by holidays. Since there is a concentration of stresses at the corners of the valve body, there is a tendency for valve bodies so welded to fail because of fracturing at the joint. This difficulty could be overcome by providing a gap between the adjacent panels prior to welding so that the weld metal could flow easily to the full thickness of the panel. However, by present methods there is no means by which the weld metal can be confined within the gap and prevented from flowing out of the gap into the valve body. Thus, by present methods a narrow gap is required in order to restrain and entrap the weld metal and confine it to the joint.

It is, therefore, an object of this invention to provide a method of welding valve bodies wherein the weld joints are of maximum thickness and strength.

It is a further object of this invention to provide a method of welding valve body joint that permits full access for weld metal into the joint while at the same time preventing flow of the weld metal from the joint.

It is a further object of this invention to provide a reinforcing strip for a welded panel valve body that facilitates assembly of a welded joint and greatly increases strength thereof.

It is a further object of this invention to provide a valve body having welded joints between body panels that are backed up by a reinforcing rib and which include weld metal to the full thickness of the joint.

In carrying out this invention, at least one pair of opposing walls are provided with reinforcing strips of right triangular cross-section which are welded to the facing surfaces of the opposing walls parallel to and along corresponding edges of each. Then the valve body panel that joins the opposing walls in the ultimate valve body is formed of a size and shape to fit between the opposing walls with a gap between the opposite edges of the panel and the walls adjacent thereto. During assembly, the interconnecting body panel may be inserted between the opposing walls and supported at opposite edges on those perpendicular sides of the reinforcing strips that extend inwardly from the opposing walls. Thus, during assembly, the reinforcing ribs provide supports which positively determine the proper position of the interconnecting panel and, additionally, bridge the gaps between the panel and opposing wall so that weld metal subsequently introduced is confined to the gap and prevented from flowing out the other side. If desired, the opposite edges of the panel may be tapered outwardly toward the internal surface thereof in order to increase the size of the gap further, thus maximizing the thickness of the weld joint. When the weld is completed, the interconnecting panel is joined to both opposing walls as well as to the reinforcing strip which has previously been welded to each, so that each joint comprises a unitary structure formed by the intimate connection of the three elements. As a further feature of this invention the reinforcing strip is of a generally right triangular cross-section of maximum thickness adjacent to the wall to which it is firmly welded as part of the joint, thus providing maximum resistance to bending stresses occasioned by internal pressure against the panel to which it was originally attached, and of minimum thickness at the point spaced from the wall to which it is firmly welded so that stresses within the reinforcing strip are minimized.

Other objects and advantages of this invention will become apparent from the specification following when read in conjunction with the accompanying drawings wherein:

FIG. 3 is a partial section view showing a valve body joint forming a part of this invention;

FIG. 4 is a partial end elevation of another form of valve constructed according to this invention;

FIG. 5 is a partial section view taken along line 5—5 of FIG. 4; and

FIG. 6 is an enlarged section view showing other valve body joints constructed according to this invention.

Figure 1:
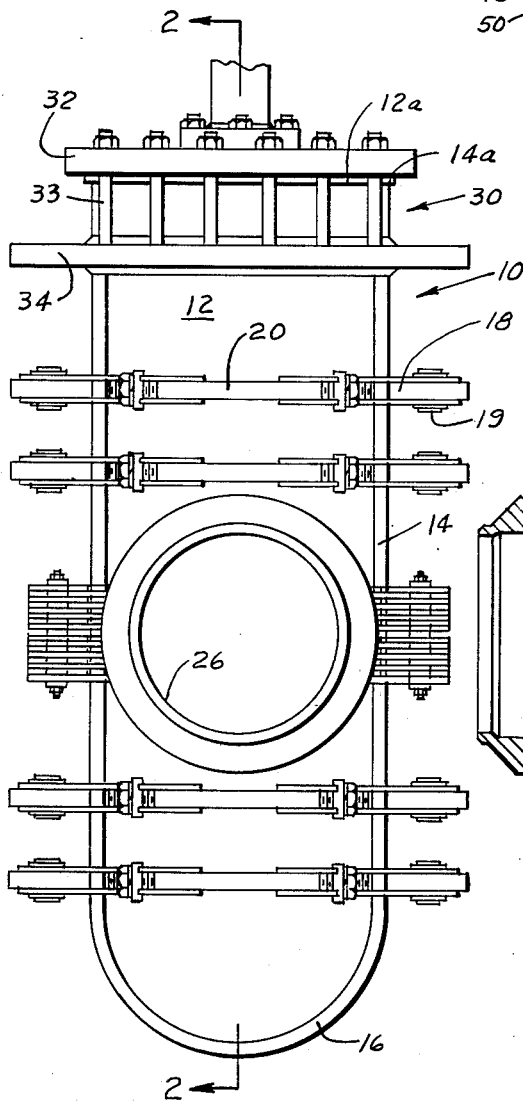
FIG. 1 is an end elevation of valve body constructed according to the method of this invention.
Figure 2:
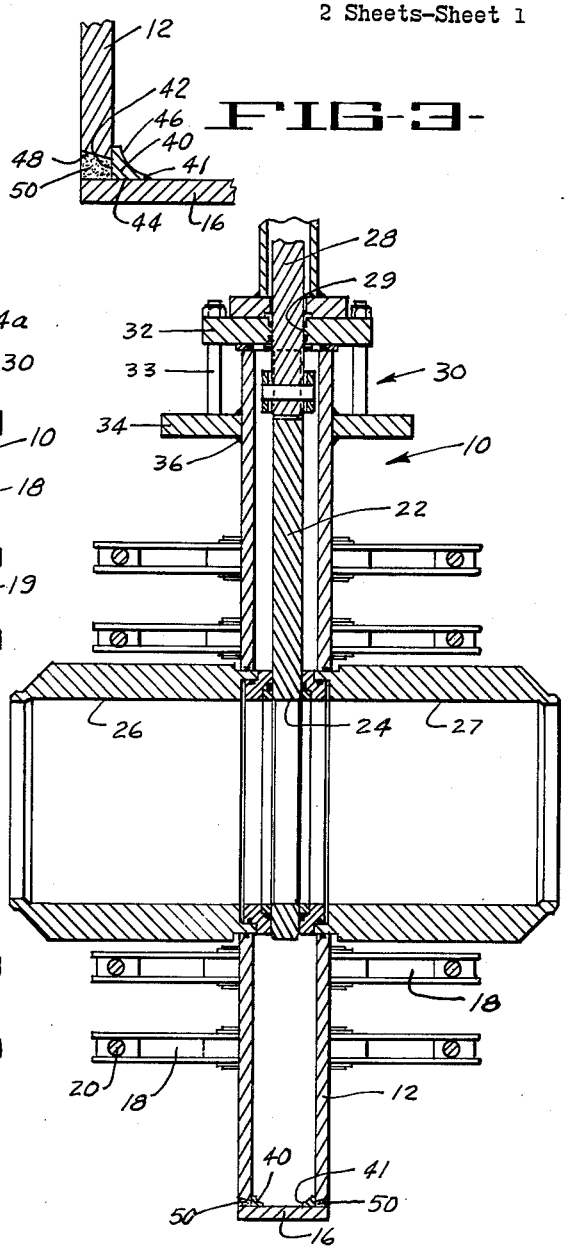
FIG. 2 is a sectional view taken along line 2—2 of FIG. 1.

Referring now particularly to FIGS. 1, 2 and 3 the valve there illustrated comprises a pair of end walls 12 and a U-shaped strip that forms side walls or panels 14 united by an integral, arcuate bottom portion 16. The end walls 12 may be reinforced against internal pressures by means of clamps 18, each of which is hinged at 19 to embrace the opposite end walls 12. The clamps 18 are arranged in pairs and the clamps of each pair are joined by adjustable fastening means such as a bolt 20 which may be tightened to clamp the members 18 securely about the body of the valve 10.

Vertically moveable within the housing 10 is the gate 22 having a port 24 which may be moved into and out of alignment with flow passages 26 and 27 in the inlet and outlet ends of valve body 10. The gate is operated by means of a valve operating stem 28 which slides through a sealed guideway 29 in the bonnet assembly 30. The bonnet assembly includes a bonnet base flange 32 which is secured onto the valve body by means of bolts 33 which, in turn, are secured to a continuous peripheral reinforcing member 34 which embraces the valve body 10 and is welded thereto at 36.

In construction of the valve body 10, the side and bottom panels 14 and 16 are preferably formed as an integral member by bending a band into a generally U-shaped configuration. A pair of reinforcement ribs or strips 40 (FIGS. 2 and 3) of a generally triangular cross-section comprising two perpendicular sides 42 and 44 are welded at 41 to the inner surface of the integral side and bottom strip. Actually, the perpendicular sides 42 and 44 of the reinforcement rib 40 do not proceed to a sharp angle but are cut off, and the third side is actually formed as a concave curved surface 46. In other words the cross-section of the reinforcement rib 40 is a square with a quadrant removed.

Each of the reinforcing ribs 40 is securely welded to the side and bottom panels 14, 16 to extend along the combined length thereof and may be pre-formed of U-shape or secured to the band 14, 16 as a flat elongate member and the composite structure bent into the U-shape configuration after the reinforcement ribs are attached.

The end walls 12 are preferably formed with a tapered edge 48 and the inner surface is slightly smaller in cross section than the area within the U-shaped side and bottom band 14, 16. The resultant space around the end wall 12 is bridged by a reinforcement rib 40 so that, with the reinforcement ribs 40 welded in place and the composite side and end member 14, 16 placed on a U-shaped side edge, a reinforcement rib 40 will provide a sort of shelf on which an end plate 12 may be supported preparatory to welding. Although the rib 40 spans the gap between the edge 48 of the end wall and the side panel 14, the taper of the edge leaves a considerable gap toward the outer surface of the end walls 12. Then, with the upper ends 12a and 14a of the end wall and side panels, respectively, placed in alignment, the weld material is introduced into the gap to flow freely therein. The resultant weld is at least as thick as the end wall 12 and firmly unites the end wall to both the side and bottom member 14, 16 and the reinforcement rib 40.

With the reinforcing rib formed of generally triangular cross-section it provides considerable resistance to internal forces parallel to its right angle side 42 that would tend to separate side 16 from the weld 50. At the same time the relatively small dimension at the peak of the triangular cross-section permits a certain amount of flexing to internal bending forces. Consequently, the thin cross-section yields with the end plate 12 while a rigid rib would tend to separate from the weld 50. Moreover, the absence of metal at the outer portion of the reinforcing rib greatly alleviates stresses therein.

Preferably also, the end wall 12 is of greater thickness than the side panel 14 so that bending stresses will tend to occur first in the side panel and about the base of the triangular reinforcement rib secured by the full weld 50.

Referring now to FIGS. 4 to 6, there is shown another form of valve having generally rectangular end walls 62, side panels 64 and a rectangular bottom panel 66. Also included are hoop-like reinforcing plates 68 which are welded at 69 to the end wall 62 and side panel 64. Inlet and outlet conduits 70 and 72 are welded to the end walls 62. If desired, the body tube formed by the end walls 62 and sides 64 may be formed by welding a pair of opposed channel members to form a single side seam intermediate of edges of each side 64 in the manner taught by United States Patent No. 2,904,306, issued September 15, 1959 for "Valve Body Construction."

The end walls and side panels may be fabricated in much the same manner as is the valve body 12 of FIGS. 1 to 3. However, in this case, the end walls 62 extend across the edges of the side and bottom panels 64 and 66.

In this construction, the reinforcing ribs 80 are first welded at 82 directly to the end walls 62 parallel to the side edges thereof. Then, with the end walls parallel to each other a side panel 64 is supported across the spaced reinforcement members 80 and the space between the tapered edge of the side panel 64 is filled with a weld material 86 that unites the side panel 64 with both the end panel 62 and the reinforcing member 80. Preferably a short reinforcement rib is first secured transversely across each side panel adjacent the bottom edges thereof so that when the side panels 64 are welded in place a reinforcement rib extends completely around the bottom opening. Then, the bottom panel 66 may be supported across the reinforcement members 80 around the bottom opening and welded firmly in place by weld material 86 intimately uniting the bottom panel 66 with end panel 62 and reinforcement member 80. Again, the bottom and side panel edges 84 may be tapered to increase the weld material capacity and in addition the reinforcement ribs 80 may be spaced from the edges of the side panel 62 by an amount greater than the thickness of the end wall 64 further to increase the thickness of the weld 86.

While this invention has been described in conjunction with preferred embodiments thereof, it is to be understood that modifications and changes therein may be made without departing from the spirit and the scope of this invention which is defined by the claims appended hereto.

What is claimed as invention is:

1. A valve body structure comprising
a U-shaped band forming valve body side and bottom panels,
a reinforcement strip having a pair of substantially perpendicular sides secured to said band parallel to an edge thereof with one of said perpendicular sides in engagement with a surface thereof.
an end wall formed to fit within said U-shaped band with the edges of said wall along substantially the entire length thereof being closely spaced from said band,
a surface of said end wall along the edges thereof being in engagement with the other of the perpendicular sides of said reinforcement strip, and
weld material filling the space defined by the edges of said end wall, said other side of the reinforcement strip and said surface of the band to unite the edges of said end wall to said U-shaped band and to said reinforcement strip.

2. The valve body structure defined in claim 1 wherein said reinforcement strip is of generally right triangular cross-section.

3. The valve body structure defined in claim 1 wherein the edges of said end wall are tapered outwardly toward the interior surface thereof to provide an enlarged, tapered space between said edges and said U-shaped band.

4. A valve body structure comprising
a pair of spaced body walls,
a pair of reinforcement strips secured to each of said body walls, each strip being disposed parallel and adjacent to an edge of a body wall,
a pair of parallel valve body panels between said body walls spaced therefrom and within the area thereof, and with a surface of each in engagement with a pair of reinforcement strips on opposing body walls, and
weld material filling the space defined by each of said body walls, the adjacent edge of the body panel and the associated reinforcement strip to unite opposite edges of each of said body panels with said body walls and with a pair of said reinforcement strips.

5. A valve body structure comprising:
a pair of parallel body walls,
a reinforcement strip having a pair of substantially perpendicular sides secured to each of said body walls parallel to and substantially co-extensive with an edge thereof with one of said perpendicular sides in engagement with a surface thereof,
a valve body panel generally perpendicular to said body walls with a surface thereof along parallel opposite edges thereof in engagement with the other of the perpendicular sides of said reinforcement strip,
the edges of one of said body panel and said pair of body walls lying within the projected area of the other, and over substantially the entire length of said parallel opposite edges being in spaced relationship thereto, and
weld material filling the space between said wall and panel on said reinforcement strip to unite said body panel, said body walls and said reinforcement strip.

6. The valve structure defined by claim 5 wherein said body panel is disposed between said body walls with opposite edges of the body panel spaced from said body walls.

7. The valve structure defined in claim 6 wherein said reinforcement strip is of generally right triangular cross-section.

8. The valve structure defined by claim 5 wherein said body panel overlaps the edges of said body walls with the adjacent surface of said body panel spaced from said body wall edges.

References Cited by the Examiner

UNITED STATES PATENTS

| | | | |
|---|---|---|---|
| 1,290,092 | 1/19 | Cole | 189—36 X |
| 1,842,735 | 1/32 | Spence. | |
| 2,683,581 | 7/54 | Rovang | 251—329 XR |
| 3,013,770 | 12/61 | Anderson et al. | 251—229 |

FOREIGN PATENTS

| | | |
|---|---|---|
| 64,453 | 6/55 | France. |
| 1,002,580 | 2/57 | Germany. |
| 1,054,800 | 4/59 | Germany. |

M. CARY NELSON, *Primary Examiner.*

MILTON KAUFMAN, MARTIN P. SCHWADRON,
*Examiners.*